US008073220B2

(12) United States Patent
Khamene et al.

(10) Patent No.: US 8,073,220 B2
(45) Date of Patent: Dec. 6, 2011

(54) METHODS AND SYSTEMS FOR FULLY AUTOMATIC SEGMENTATION OF MEDICAL IMAGES

(75) Inventors: Ali Khamene, Princeton, NJ (US); Leo Grady, Yardley, PA (US); Eike Rietzel, Darmstadt (DE); Thomas Boettger, Heidelberg (DE)

(73) Assignee: Siemens Aktiengesellschaft, München (DE)

( * ) Notice: Subject to any disclaimer, the term of this patent is extended or adjusted under 35 U.S.C. 154(b) by 449 days.

(21) Appl. No.: 12/426,320

(22) Filed: Apr. 20, 2009

(65) Prior Publication Data

US 2010/0266170 A1 Oct. 21, 2010

(51) Int. Cl.
*G06K 9/34* (2006.01)
*G06K 9/00* (2006.01)

(52) U.S. Cl. ........................................ 382/128; 382/173

(58) Field of Classification Search ................ 382/128, 382/173; 345/418, 419, 424, 427; 356/12; 128/922
See application file for complete search history.

(56) References Cited

U.S. PATENT DOCUMENTS

| 2005/0069206 A1* | 3/2005 | Ma et al. | 382/190 |
| 2007/0058865 A1* | 3/2007 | Li et al. | 382/173 |
| 2008/0317308 A1* | 12/2008 | Wu et al. | 382/128 |
| 2009/0136103 A1* | 5/2009 | Sonka et al. | 382/128 |

OTHER PUBLICATIONS

Boykov, Y., Jolly, M.P.: Interactive organ segmentation using graph cuts. In: Medical Image Computing and Computer-Assisted Intervention, Pittsburgh, PA (Oct. 2000) 276-286.
Grady, L.: Random walks for image segmentation. IEEE Trans. on Pattern Analysis and Machine Intelligence 28(11) (Nov. 2006) 1768-1783.
Jolly, M.P., Grady, L.: 3D general segmentation in CT. In: Proc. of ISBI 2008, IEEE (May 2008) 796-799.
Held, K., Kops, E.R., Krause, B.J., Wells III, W.M., Kikinis, R., Muller-Gartner, H.W,: Markov random field segmentation of brain MR images. IEEE T-MI 16(6) (1997) 876-886.
Akselrod-Ballin, A., Galun, M., Gomori, M.J., Basri, R., Brandt, A.: Atlas guided identification of brain structures by combining 3D segmentation and SVM classification. In: MICCAI. vol. 2. (2004) 209-217.
van der Lijn, F., den Heijer, T., Breteler, M.M.B., Niessen, W.: Combining graph cuts, atlas registration, and voxel classification for hippocampus segmentation in MR images. In: MMBIA. (2007).
Cuadra, M.B., Pollo, C., Bardera, A., Cuisenaire, O., Villemure, J.G., Thiran, J.P.: Atlas-based segmentation of pathological MR brain images using a model of lesion growth. IEEE T-MI 23(10) (2004) 1301-1314.
Ling, H., Zhou. S.K,Y., Z., Georgescu, B., Suehling, M., Comaniciu. D.: Hierarchical, learning-based automatic liver segmentation. In: CVPR, (2008) 1-8.
Maintz, J.B.A., Viergever, M.: A survey of medical image registration. Medical Image Analysis 2(1) (1998) 1-36.

(Continued)

*Primary Examiner* — Seung C Sohn
(74) *Attorney, Agent, or Firm* — Donald B. Paschburg (57) ABSTRACT

Methods and systems dedicated to automatic object segmentation from image data are provided. In a first step a fuzzy seed set is generated that is learned from training data. The fuzzy seed set is registered to image data containing an object that needs to be segmented from a background. In a second step a random walker segmentation is applied to the image data by using the fuzzy seed set as an automatic seeding for segmentation. Liver segmentation, lung segmentation and kidney segmentation examples are provided.

20 Claims, 9 Drawing Sheets

OTHER PUBLICATIONS

Grady, L.: Multilabel random walker image segmentation using prior models. In: Proc. of CVPR. (2005) 763-770.

Singaraju, D., Grady, L., Vidal, R.: Interactive image segmentation of quadratic energies on directed graphs. In: Proc. of CVPR 2008, IEEE Computer Society. IEEE (Jun. 2008).

Grady, L., Schwartz, E.L.: Isoperimetric graph partitioning for image segmentation IEEE Trans. on Pat. Anal. and Mach. Int. 28(3) (Mar. 2006) 469-475.

Kainmueller, D., Lange, T., Lamecker., H.: Shape constrained automatic segmentation of the liver based on a heuristic intensity model. In: MICCAI Wshp. 3D Segmentation in the Clinic: A Grand Challenge. (2007).

Rusko, L., Bekes, G., Nemeth, G., Fidrich, M.: Fully automatic liver segmentation for contrast-enhanced CT images. In: MICCAI Wshp. 3D Segmentation in the Clinic: A Grand Challenge. (2007).

Soler, L., Delingette, H., Malandain, G., Montagnat, J., Ayache, N., Koehl, C., Dourthe, O., Malassagne, B., Smith, M., Mutter, D., Marescaux, J.: Fully automatic anatomical, pathological, and functional segmentation from ct scans for hepatic surgery. Computer Aided Surgery 6(3) (2001) 131-142.

Lamecker, H., Lange, T., Seebaee, M.: Segmentation of the liver using a 3D statistical shape model. In: ZIB Tech Report. (2004).

Heimann, T., Munzing, S., Meinzer, H.P., Wolf, I.: A shape-guided deformable model with evolutionary algorithm initialization for 3D soft tissue segmentation. In: IPMI. (2007).

Timothy F. Cootes, Christopher J. Taylor, David H. Cooper, Jim Graham: Active Shape Models—Their Training and Application. Computer Vision and Image Understanding 61(1): 38-59 (1995).

Andrew Hill, Timothy F. Cootes, Christopher J. Taylor: Active Shape Models and the shape approximation problem. Image Vision Comput. 14(8): 601-607 (1996).

Timothy F. Cootes, Gareth J. Edwards, Christopher J. Taylor: Active Appearance Models. ECCV (2) 1998: 484-498.

S. Warfield and A. Robatino and J. Dengler and F. Jolesz and R. Kikinis, Nonlinear Registration and Template Driven Segmentation, chapter 4, pp. 67-84, Progressive Publishing Alternatives, 1998.

* cited by examiner

METHODS AND SYSTEMS FOR FULLY AUTOMATIC SEGMENTATION OF MEDICAL IMAGES

BACKGROUND OF THE INVENTION

The present invention relates to methods and systems for automatically segmenting medical images. More specifically, it is related to image segmentation using a two phase approach of first modeling and then segmenting.

Automatic and semi-automatic segmentation algorithms have been proposed and studied in the literature extensively. Of specific interest herein is the model based approach. There are two major classes of model based approaches. In the first category, the model includes either shape or deformation of shape as for instance described in "Timothy F. Cootes, Christopher J. Taylor, David H. Cooper, Jim Graham: Active Shape Models-Their Training and Application. Computer Vision and Image Understanding 61(1): 38-59 (1995)" or appearance variations in a statistical framework as described in "Andrew Hill, Timothy F. Cootes, Christopher J. Taylor: Active Shape Models and the shape approximation problem. Image Vision Comput. 14(8): 601-607 (1996);" and "Timothy F. Cootes, Gareth J. Edwards, Christopher J. Taylor: Active Appearance Models. ECCV (2) 1998: 484-498." In the second approach, a static template is used, where usually the global/local appearance variations in the form of histograms or probability density functions are modeled, as described in for instance "S. Warfield and A. Robatino and J. Dengler and F. Jolesz and R. Kikinis, Nonlinear Registration and Template Driven Segmentation, chapter 4, pp. 67-84, Progressive Publishing Alternatives, 1998."

In both approaches, the model has to be initialized within the coordinate system of the data to be segmented. There are also numerous approaches as to which segmentation methodology is used and how the model is fit to the data in order to arrive at the final segmentation, as for instance described in "U. Grenander, General Pattern Theory. Oxford, U.K.: Oxford Univ. Press, 1994."

Despite the large number of segmentation tasks in medical imaging, no universal method for producing an automatic segmentation has emerged. Instead, each segmentation task has been addressed (often several times) by a method which is specifically tailored for each segmentation problem. In contrast to these automatic segmentation approaches, the class of interactive segmentation methods is employed universally across segmentation tasks and modalities. Recently, these interactive methods have become quite mature and effective.

Currently, no universal methods and systems are available that automatically generate seeds for object to be segmented by learning a seed weight distribution, transferring automatically the seed weight distribution to the image data and invoking a seeded graph based segmentation. Accordingly, improved and novel methods and systems for such a seeded graph segmentation are required.

SUMMARY OF THE INVENTION

One aspect of the present invention presents a novel method and system that will provide an automatic segmentation of an object from a background in image data.

In accordance with a further aspect of the present invention a method is provided for universal segmentation of an object from an image data set by a processor, comprising applying an atlas data set corresponding to the image data set, creating a plurality of segmented objects from a plurality of training data sets, registering the plurality of segmented objects to the atlas data set, applying the registered plurality of segmented object as fuzzy seeds, and segmenting the object from the image data set by a random walker segmentation using the fuzzy seeds.

In accordance with yet a further aspect of the present invention a method is provided, wherein the atlas data set contains a segmentation of an object which may be represented by an initial mask $M_a$.

In accordance with yet a further aspect of the present invention a method is provided, wherein a segmented object i in one of a plurality of n segmented objects may be represented as a binary mask $M_i$ and a fuzzy seed volume $M_a^f$ of fuzzy seeds may be represented by $$M_a^f = \frac{1}{n+1}\left(M_a + \sum_i M_i\right)$$

with n an integer greater than 1.

In accordance with yet a further aspect of the present invention a method is provided, further comprising transforming $M_a^f$ into a coordinate system of the image data set.

In accordance with yet a further aspect of the present invention a method is provided, further comprising removing fuzzy seeds from mask $M_a^f$ that are registered to pixels in the image data set having outlier intensities described by a probability density function of pixel intensities contained in mask $M_a^f$.

In accordance with yet a further aspect of the present invention a method is provided, wherein the random walker segmentation is performed as a directed random walker with unary terms provided by the fuzzy seeds.

In accordance with yet a further aspect of the present invention a method is provided, wherein the registration of the image data set to the atlas data set is a process containing a plurality of steps, wherein a step can be expressed as $$\hat{T}_k = \arg\max_T S_{M_k}(I_a(x), I(T(x))) \text{ subject to } C_k(T) = 0,$$

with k being a step number, $S_{M_k}$ is a similarity measure, $M_k$ is a specific mask used to compute the similarity measure, I is the image to be registered to the atlas data, x represent the pixels in I, and $C_k$ is a transformation constraint enforced on T, which is a transformation map.

In accordance with yet a further aspect of the present invention a method is provided, wherein the registration comprises at least applying mutual information as a metric and global affine with a reduced set of parameters, applying mutual information and local affine with a reduced set of parameters, applying cross-correlation and local affine with all 12 parameters.

In accordance with yet a further aspect of the present invention a method is provided, wherein the registration is repeated in a hierarchical fashion.

In accordance with yet a further aspect of the present invention a method is provided, wherein the object is one of a group consisting of liver, lung and kidney.

In accordance with another aspect of the present invention a system is provided comprising a processor, a memory readable by the processor, the memory comprising program instructions executable by the processor, the program instructions adapted to perform the steps of the methods provided herein as one or more aspects of the present invention.

DESCRIPTION OF A PREFERRED EMBODIMENT

Medical imaging has an incredible number of segmentation problems to be addressed. For many of these problems, several segmentation methods have been proposed that take advantage of the problem domain to produce a quality solution. The MICCAI segmentation challenges of the past few years have highlighted the large variety of segmentation methods that may applied to any specific segmentation task. This variety of algorithms tailored to each segmentation application might cause despair that one may never hope to achieve a universal methodology for approaching new segmentation problems that does not require tailoring for each application.

In contrast to the task-specific tailoring of automatic segmentation methods, the recent body of interactive segmentation methods has proven to be quite universal and effective as is described for instance in "[1]. Boykov, Y., Jolly, M. P.: Interactive organ segmentation using graph cuts. In: Medical Image Computing and Computer-Assisted Intervention, Pittsburgh, Pa. (October 2000) 276-286" and "[2]. Grady, L.: Random walks for image segmentation. IEEE Trans. on Pattern Analysis and Machine Intelligence 28(11) (November 2006) 1768-1783." These algorithms input a set of user-defined seeds that label a small set of pixels as belonging to foreground and others as belonging to background. Additionally, intensity or other priors may be incorporated as region terms (i.e., unary terms, priors) which are generally learned on the fly from the seed points.

Although these interactive methods typically have no prior information about target shape or context, they have become highly effective standard tools in medical image processing across segmentation tasks and modalities. The agnosticism of these methods to the desired segmentation target have made them very effective for tumor segmentation, where the image intensities and tumor shape are highly variable as is for instance described in "[3]. Jolly, M. P., Grady, L.: 3D general segmentation in CT. In: Proc. of ISBI 2008, IEEE (May 2008) 796-799."

The universality of the interactive methods to produce an automatic segmentation algorithm will be employed so that it may be directed to automatically segment any object after training with a small number of manual segmentations. The goal is that this new algorithm requires zero adjustment between segmentation tasks. In other words, the goal of the methods and systems provided in accordance with one or more aspects of the present invention is that a new automatic segmentation algorithm can be generated simply by inputting a small number of training segmentations for the new task.

Specifically, the design goals for this universal automatic segmentation method are:

1. Small training set: It is desirable that models are generated quickly, possibly by an end user with no image processing/coding expertise. Additionally, some new applications (e.g., generated via new acquisition equipment) have very little training data available in early stages and it is desirable to produce an automatic segmentation engine for these applications.

2. Universal: The algorithm should produce quality, automatic segmentations without any tuning for a specific application or modality. This property is important because it allows for fast development time of an automatic segmentation algorithm and allows for new applications without the modification of code by an image analysis specialist.

3. Fast: The on-line segmentation time should be fast enough to allow for routine clinical use.

Although the interactive methods are universal and effective, they require user involvement to provide guidance of roughly where to look for a target object. As an aspect of the present invention the training segmentations are used to provide this information by hierarchically registering the presegmented training data to an input dataset. The robustness exhibited by these interactive algorithms implies that a registration does not need to fully capture full shape variability across the images, but needs to get close enough. Furthermore, instead of using user-contributed seeds in these interactive approaches, the set of registered training segmentations is employed as fuzzy seeds.

The registered training segmentations are in fact forming an atlas capturing shape variability of the organ of interest. Instead of setting the region terms in the traditional manner (based on learned intensities, etc.), these fuzzy seeds are employed as region terms and dispense entirely with the "hard" seeds that typically accompany interactive techniques.

Like a number of atlas-driven segmentation approaches, one approach in accordance with an aspect of the present invention has two stages. There is an initial stage that aligns an input data set to an atlas where a training segmentation is available. The final stage produces the segmentation based on the input data and the correspondence to the training segmentation.

Typically the second stage has been solved within the framework of Markov random fields, as for instance described in "[4]. Held, K., Kops, E. R., Krause, B. J., Wells III, W. M., Kikinis, R., Muller-Gartner, H. W.: Markov random field segmentation of brain MR images. IEEE T-MI 16(6) (1997) 876-886", by techniques such as expectation maximization, as for instance described in "[5]. Zhang, Y., Brady, M., Smith, S.: Segmentation of brain MR images through a hidden Markov random field model and the expectation-maximization algorithm. IEEE T-MI 20(1) (2001) 45-57", or iterated conditional mode as for instance described in "[6]. Park, H., Bland, P. H., Meyer, C. R.: Construction of an abdominal probabilistic atlas and its application in segmentation. IEEE T-MI 22(4) (2004) 483-492."

Other approaches have used level sets, such as described in for instance "[7] Ciofolo, C.: Atlas-based segmentation using level sets and fuzzy labels. In Barillot, C., Haynor, D., Hellier, P., eds.: MICCAI. (2004) 310-317", or support vector machines, such as described in for instance "[8]. Akselrod-Ballin, A., Galun, M., Gomori, M. J., Basri, R., Brandt, A.: Atlas guided identification of brain structures by combining 3D segmentation and SVM classification. In: MICCAI. Volume 2. (2004) 209-217."

A clear benefit of the approach as provided herein in accordance with an aspect of the present invention over these other techniques is that through the use of the random walker segmentation the solution is guaranteed to be globally optimal for a formulation as provided herein. This helps ensure robustness to errors in the initial alignment stage. Also the random walker provides better segmentation than these other techniques in the common case of partial or missing contrast at the boundary between organs.

Graph cuts were described for instance in "[9]. van der Lijn, F., den Heijer, T., Breteler, M. M. B., Niessen, W.: Combining graph cuts, atlas registration, and voxel classification for hippocampus segmentation in MR images. In: MMBIA. (2007)" for atlas-driven segmentation. Unlike graph cuts, the random walker approach provides optimal results for multiple organs as well as for figure-ground separation. Also, random walker is less sensitive to the output of the initial stage since it is less sensitive to the free parameters it shares with graph cuts. More recent atlas-driven segmentation work utilizes organ specific segmentations as described in "[10]. Haas, B., Coradi, T., Scholz, M., Kunz, P., Huber, M., Oppitz, U., Andre, L., Lengkeek, V., Huyskens, D., van Esch, A., Reddick, R.: Automatic segmentation of thoracic and pelvic CT images for radiotherapy planning using implicit anatomic knowledge and organ-specific segmentation strategies. Physics in Medicine and Biology 53 (2008) 1751-1771" or pathology specific segmentations as described in "[11]. Cuadra, M. B., PolIo, C., Bardera, A., Cuisenaire, O., Villemure, J. G., Thiran, J. P.: Atlas-based segmentation of pathological MR brain images using a model of lesion growth. IEEE T-MI 23(10) (2004) 1301-1314. " The strength of an approach as provided herein in accordance with an aspect of the present invention is its universality.

Method

In a first embodiment of the present invention a graph based semi-automatic approach is used as the segmentation engine within the paradigm of a two phase model based segmentation approach. Image registration techniques are used during both the training and the segmentation phases. The graph-based semi-automatic approaches usually require a set of spatially dispersed seeds located on the object of the interest and its surroundings. During the learning or modeling phase, a strategy is devised to find a set of "optimal" weights for these seeds, indicating the degree or the probability of each voxel to belong to each of the target objects (or background).

Training/Modeling Phase

The procedure for computing the "optimal" seed weight distributions along with the weights is as follows:

1. Use a set of medical images, and delineate the region of interest (VOI) for each target segmentation object on each of them, i.e., perform a ground-truth segmentation of all the target objects on the training set;

2. Select one of the medical images as the frame of reference, and register all others to that. The registration procedure may be hierarchical, where a low parameter global registration is done first, followed by a local registration based on the VOI;

3. Use the registration results, to transfer all of the VOIs onto the image selected as the frame of reference;

4. Consider the bounding box encompassing the union of the transferred VOIs plus a margin, which is based on the size of the union of VOIs. This margin is important to accurately take into account the background;

5. Compute a weight distribution for each label in the ground-truth segmentations (including background) in which the label weight at each voxel is proportional to the number of transferred VOI labels assigned to that voxel in the reference image;

6. Keep the medical images selected as the frame of reference or the template as the representative image.

Segmentation Phase

The segmentation procedure can be divided into the following steps.

1. The template is registered with the image to be segmented using the exact same registration procedure performed during the training phase;

2. The seed locations and weights are transferred to the image to be segmented;

3. The graph-based semi-automatic segmentation is invoked based on the transformed seed distributions to produce a (possibly multi-label) segmentation, such as described in for instance "[2] Leo Grady, "Random Walks for Image Segmentation", IEEE Trans. on Pattern Analysis and Machine Intelligence, Vol. 28, No. 11, pp. 1768-1783, November, 2006" and "[14] Leo Grady, "Multilabel Random Walker Image Segmentation Using Prior Models", in Proceedings of CVPR05, Vol. 1, p. 763-770, San Diego, Calif. June 2005."

The graph based segmentation approach in this case does the graph partitioning based on both the seed locations and weight, which are considered as the prior knowledge encoding shape variations and the image data itself. Seed distribution along with the corresponding weights capture the shape variability up to the set of registration parameters used to bring the VOI segmentations into the frame of reference. As more data is used to generate the seed distribution, the quality of the segmentation should be increased.

Figure 1:
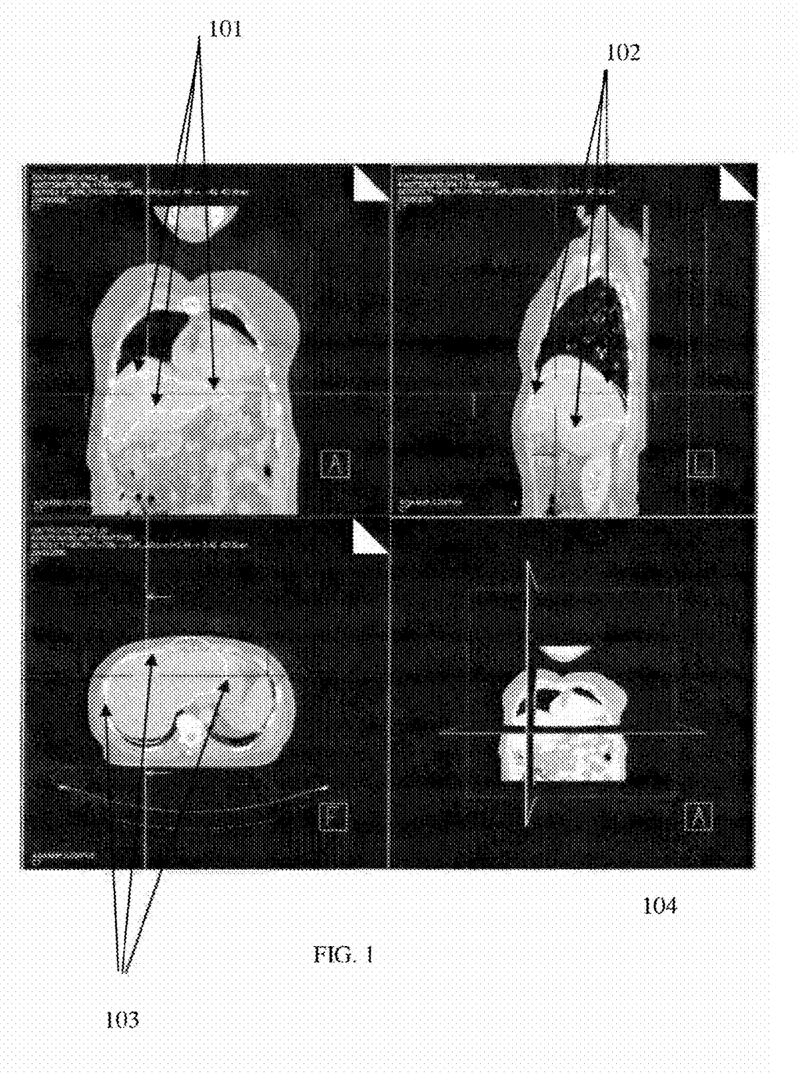
FIG. 1 illustrates a first step performed in accordance with one aspect of the present invention.
Figure 2:
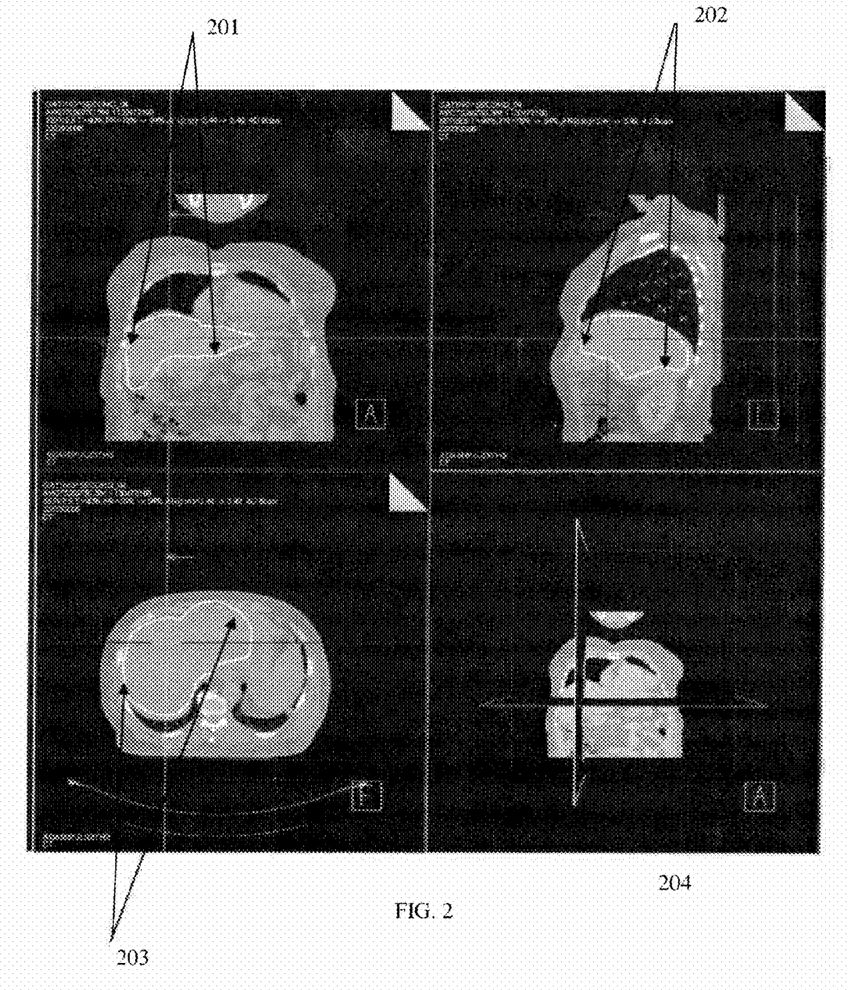
FIG. 2 illustrates another step accordance with an aspect of the present invention.
Figure 3:
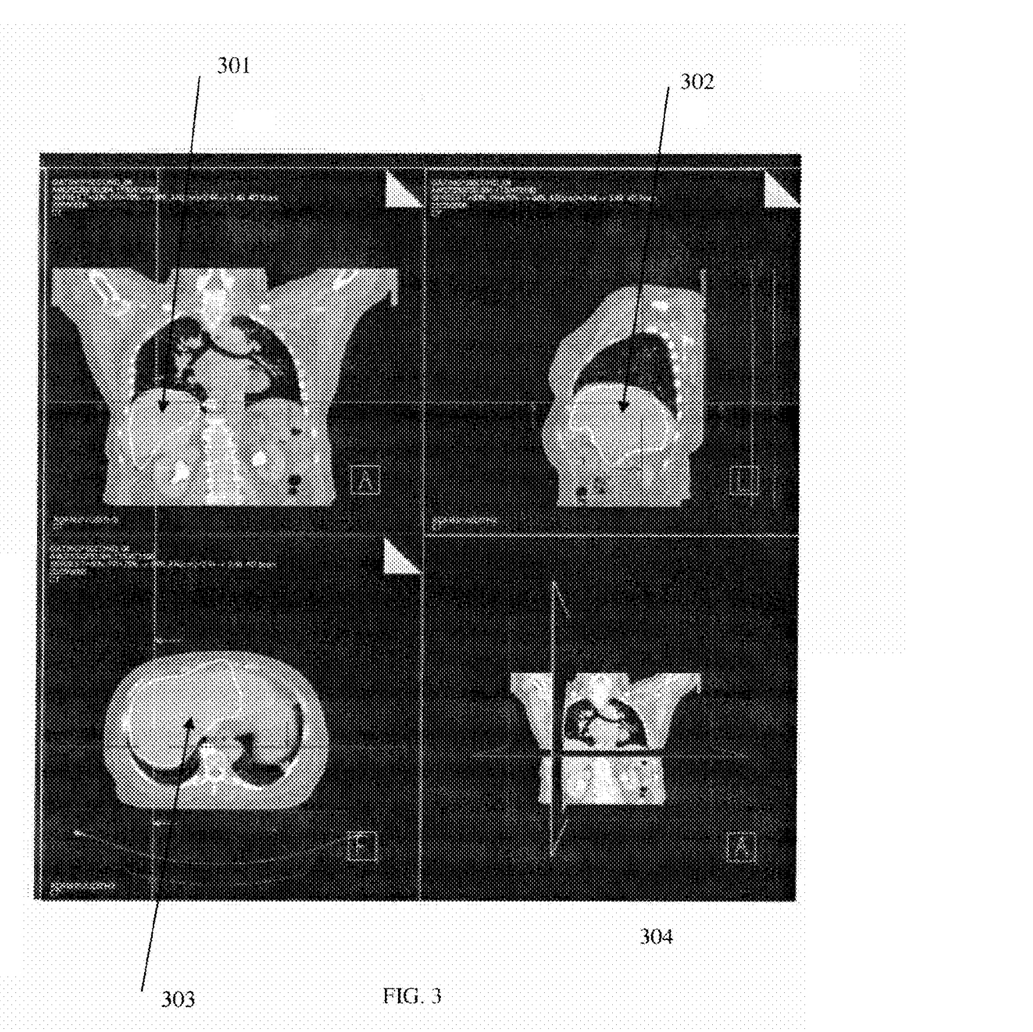
FIG. 3 illustrates yet another step accordance with an aspect of the present invention.

Results of the segmentation of the first embodiment are illustrated in FIGS. 1, 2 and 3. FIG. 1 shows an original CT volume to be segmented overlaid with the model liver segmentation. The model liver segmentations are identified as 101, 102 and 103. Image 104 provides the orientation of the view. FIG. 2 shows the CT volume (affine) and the model liver segmentation. These model liver segmentations are identified as 201, 202 and 203. Image 204 provides the orientation of the view. FIG. 3 shows a deformed CT volume and the model liver segmentation with the actual segmentation invoked based on the seeds generated by the model segmentation. The actual segmentations are identified as 301, 302 and 303. Image 304 provides the orientation of the view.

In a second embodiment, the method consists of at least two major parts; offline model building and online segmentation. Both these parts utilize segmentation and registration techniques, which are detailed in this section.

Offline Model Building

The offline model building stage is simple and transparent for an end-user. For a given segmentation application, the user manually segments a small number (5-10) of datasets containing the target object. Let n represent the number of training datasets employed. Note that this small number of training segmentations is much less than the number of training segmentations required by machine learning approaches [12]. The output of the offline model building module is a fuzzy seed volume $M_a^f$ corresponding to the atlas volume $I_a$, and an intensity distribution probability density function $p_a$.

The fuzzy seed volume is generated by registering the training segmentations to the selected atlas dataset (i.e., $I_a$ with corresponding initial mask of $M_a$). If one treats each registered training segmentation instance i as a binary mask $M_i$, then one may produce the fuzzy seed volume, as follows:

$$M_a^f = \frac{1}{n+1}\left(M_a + \sum_i M_i\right).$$

Note that $M_a^f$ exists in the same space as the atlas dataset. The probability density function, $p_a$, is generated via Parzen windowing of the intensities contained in the training mask.

Online Segmentation

The online segmentation module segments a new datasets via the following steps:

1. Register the atlas dataset to the new dataset and transform $M_a^f$ in to new dataset coordinate system.
2. Remove any fuzzy seeds that are registered to pixels having outlier intensities described by $p_a$.
3. After intensity conditioning to increase the dynamic range, fit a mixture model to describe the intensities in the new dataset from the registered fuzzy seed distribution. Assign each pixel in the new dataset the probability that this pixel belongs to the foreground model.
4. Run the directed random walker algorithm with unary terms given by the fuzzy seeds and edge weights given by the intensity model probabilities.

Registration

The registration challenges include (1) large variations in the field of view (FOV), (2) inter-patient anatomical shape and intensity variability, and (3) computation complexity. A multi-step registration approach is devised to address these challenges, as also described in for instance "[13]. Maintz, J. B. A., Veirgerver, M.: A survey of medical image registration. Medical Image Analysis 2(1) (1998) 1-36." Each step of registration problem can be formulated as follows:

$$\hat{T}_k = \underset{T}{\mathrm{argmax}}\, S_{M_k}(I_a(x), I(T(x))) \text{ subject to } C_k(T) = 0,$$

where k is the step number, $S_{M_k}$ is the similarity measure and $M_k$ is the specific mask used to compute it, I is the image to be registered to atlas. and finally $C_k$ is the specific transformation constraint enforced on T. In order to deal with FOV variations and gain robustness and speed, in different steps, one may vary the similarity metric, the domain size, and the degrees of freedom for the transformation space.

A three step approach in accordance with an aspect of the present invention is devised as follows:

1. Mutual information as the metric and global affine with reduced set of parameters (i.e., all translations and in-plane scales-assuming one deals with cross-sectional axial CT slices),
2. Mutual information and local affine with reduced set of parameters (i.e., all translations and the out-of-plane scale). The notion of local is defined using the expanded region of the interest computed from either $M_a$ during the offline model building or $M_a^f$ during the online segmentation.
3. Cross-correlation and local affine with all 12 parameters, where local is defined using a mask tightly around the region of the interest, computed the same manner as in the previous step.

The registration may be such that the core registration is repeated in a hierarchical fashion (by changing k), where the region of interest signified by the mask $M_k$ is selected to cover the whole body at the beginning and decreasingly down to a tight region around the organ of interest (to be modeled or segmented).

The registration method may be such that the core registration is repeated in a hierarchical fashion and the degrees of freedom used to represent the transformation map T is varied for each level within the hierarchy. The registration method may be such that the core registration algorithm uses various degrees of freedom for transformation map to cover, rigid, affine, free form, dense variational cases posed by the constraint $C_k$. The registration method may be such that the core registration algorithm uses various image similarity measures, such as mutual information, sum of squared difference, cross correlation or any other image similarity measure that can be applied to a registration process.

The aspects of the invention can be extended to use various seed-based segmentation and/or registration methods or procedures. The hierarchical registration procedure can have various numbers of levels with increasing number of parameters at the lower (local) levels. Registration steps can be implemented based on rigid, affine, free-form, or even dense variational formulations. These formulations are known and are fully contemplated to be applied herein.

One or more aspects of the present invented were tested with an image data set. The test included using the segmentation of one patient's liver as a basis for automatically computing the seed weights to segment the liver of another patient through registration as was explained above. Although this example applies a two-label segmentation task (foreground vs. background), it is important to note that an arbitrary number of objects may be automatically and simultaneously segmented using methods and systems disclosed herein.

The final registration transformation is $\hat{T} = \hat{T}_2 \circ \hat{T}_1 \circ \hat{T}_0$, where $\circ$ denotes a transformation composition operator. For the rest of this disclosure, it is assume that the fuzzy seed map is transformed to the space of the image to be segmented, therefore for short, one has $$M_a^f(x) = M_a^f(\hat{T}^{-1}(x)).$$

Segmentation

The new dataset may have a different intensities range than the training data. This difference can be a result of physiological changes (e.g., use of a contrast agent), pathology (e.g., necrotic tissue), acquisition protocol (e.g., different reconstruction methods) or data artifacts (e.g., metal implants in a CT dataset). To serve a goal of universality, an intensity model is built that is adapted to the intensity characteristics of the new dataset.

After data specific intensity conditioning operation to increase the dynamic range, a mixture model is employed as an intensity model to accommodate target organs that may contain multiple internal tissue types. For example, in the liver segmentation application, a liver may contain lesions, calcification or high intensity vasculature due to a contrast agent. Each of these internal tissue types is represented by one intensity centroid in the mixture model. Specifically, K-means are used to find centroids of the intensities found in areas where $M_a^f(x) > 0.5$.

The value of K chosen did not seem to have much effect on the results, but herein K=6 was selected. Centroids for which few pixels in this region were associated $$\left( < \frac{1}{K} \right)$$

were dropped from further consideration. If one uses C centroids having intensity $c_j$ and variance $\sigma_j^2$, then one may define a distance for a pixel having intensity g to each centroid as $$d = \min_j \frac{(g-c_j)^2}{\sigma_j^2}.$$

As an alternative to the heavy tails of a Gaussian kernel, the more compact Epanechnikov kernel is employed to define a probability to each pixel to belong to the foreground object. Specifically, the foreground probability of a pixel with centroid distance given by its intensity is $$p = 1 - \frac{d}{\alpha}$$

for $d > \alpha$ and 0 otherwise.

It was empirically determined that an effective choice of $\alpha$ is $\alpha=10$. The foreground probabilities assigned to each pixel could now be employed in conjunction with any number of image segmentation algorithms. However, due to the quality of the results reported in the literature and the future ability of allow multi-class segmentation, the random walker segmentation algorithm described in "[2] Grady, L.: Random walks for image segmentation. IEEE Trans. on Pattern Analysis and Machine Intelligence 28(11) (November 2006) 1768-1783" is employed with the unary terms introduced in "[14] Grady, L.: Multilabel random walker image segmentation using prior models. In: Proc. of CVPR. (2005) 763-770." Specifically, if the fuzzy seed strength at pixel i is greater than 0.5, a unary term is attached from the foreground to pixel i with strength equal to $$f_i = \left(M_a^f(x_i) - \frac{1}{2}\right)p_i.$$

If the fuzzy seed strength at pixel i is less than 0.5, a unary term is attached from the foreground pixel to background with strength equal to $$b_i = \frac{1}{2} - M_a^f(x_i).$$

In addition to the unary terms, it is known that the boundary should transition from high values of p to low values of p, so one may employ directed edges. If $p_i > p_j$, an edge weight given by $w_{ij} = \exp(-\beta(p_i - p_j)^2)$ is assigned, and otherwise $w_{ij} = 1$ is assigned. This weighting strongly penalizes labeling pixel i foreground and pixel j background when $p_j > p_i$. The minimization of the random walker segmentation model for directed edges was described in "[15] Singaraju, D., Grady, L., Vidal, R.: Interactive image segmentation of quadratic energies on directed graphs. In: Proc. of CVPR 2008, IEEE Computer Society, IEEE (June 2008)." In the present segmentations, each voxel was associated with a node and connected neighboring voxels using a 6-connected lattice.

The output of the random walker algorithm is a value assigned to each pixel describing the probability that the pixel belongs to the segmentation. When using the random walker algorithm, these probabilities are typically thresholded at 0.5 to produce the final binary segmentation. However, in one aspect of a method provided with an aspect of the present invention the strength of the unary terms is dependent on p, which is in turn dependent on the image intensities. Therefore, a threshold of 0.5 many not be comparable between segmentations. Consequently, one approach was taken of using the threshold that produced a segmentation with minimal isoperimetric ratio as described in "[16]. Grady, L., Schwartz, E. L.: Isoperimetric graph partitioning for image segmentation. IEEE Trans. on Pat. Anal. and Mach. Int. 28(3) (March 2006) 469-475," which may be found in linear time.

In accordance with an aspect of the present invention the fuzzy seeds provide indication of the likely shape of the object to be segmented. In accordance with a further aspect of the present invention, the shape information is infused within the graph based segmentation technique. In accordance with a further aspect of the present invention, the spread of fuzzy seeds depends on the uncertainly of shape variation across training datasets.

Results

In this section the universality is demonstrated of an approach as described herein to generating an automatic segmentation system for liver, lung and kidney. These three segmentation tasks target organs with a variety of sizes, shapes and intensities. For liver, training was done with 20 datasets, while for lung and kidney (left and right separately) only 10 training data sets with segmentations were used. In the offline training mode, after mapping the segmentation to the atlas coordinate system, a smoothing operation was used to rather compensate for small number of training sets.

Figure 4:
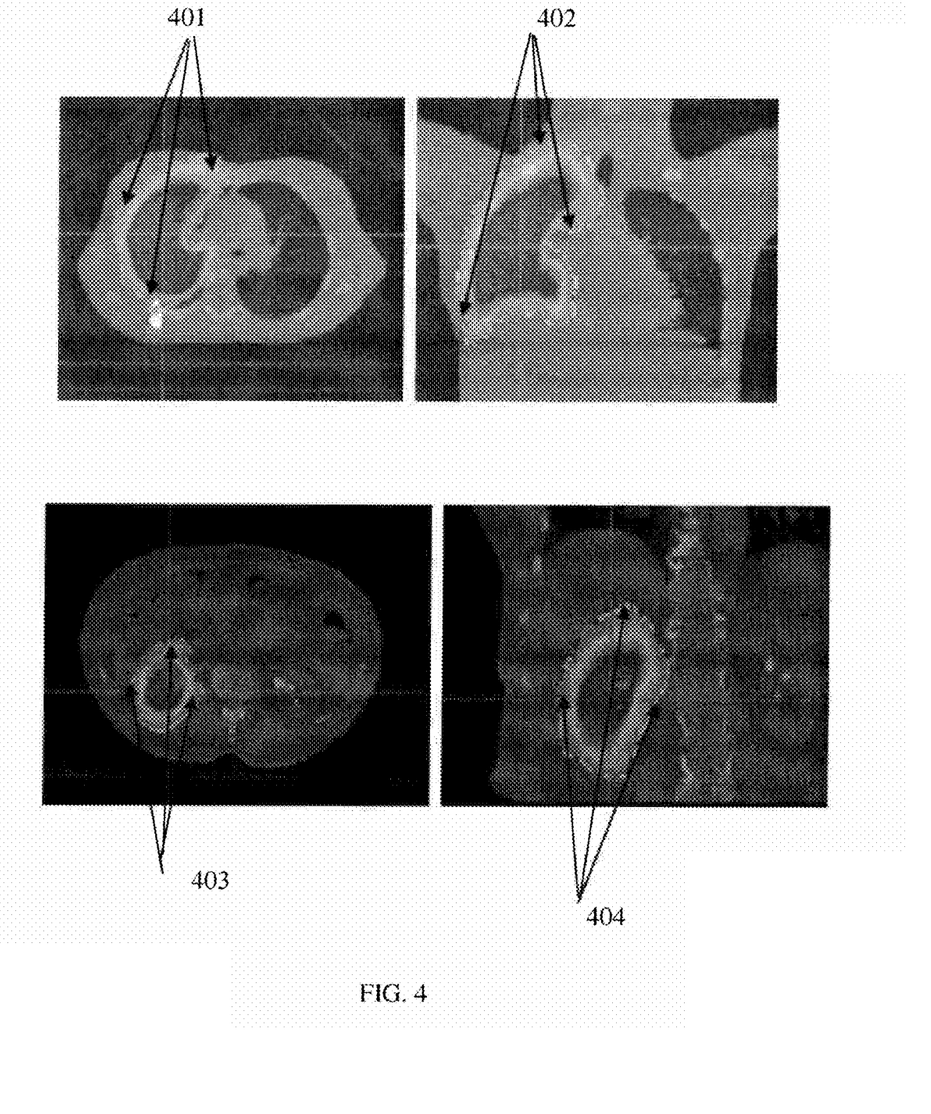
FIG. 4 illustrates a fuzzy seed map created in accordance with an aspect of the present invention.

FIG. 4 gives an illustration of the trained fuzzy maps for lung and kidney. The fuzzy seed maps are identified as 401, 402, 403 and 404. These are transformed fuzzy seed map $M_a^f$ as the result of the registration step, where the darker center depicts higher counts and the lighter edge depicts a lower count. Furthermore, it shows the registered map to specific target data set via registration.

Figure 5:
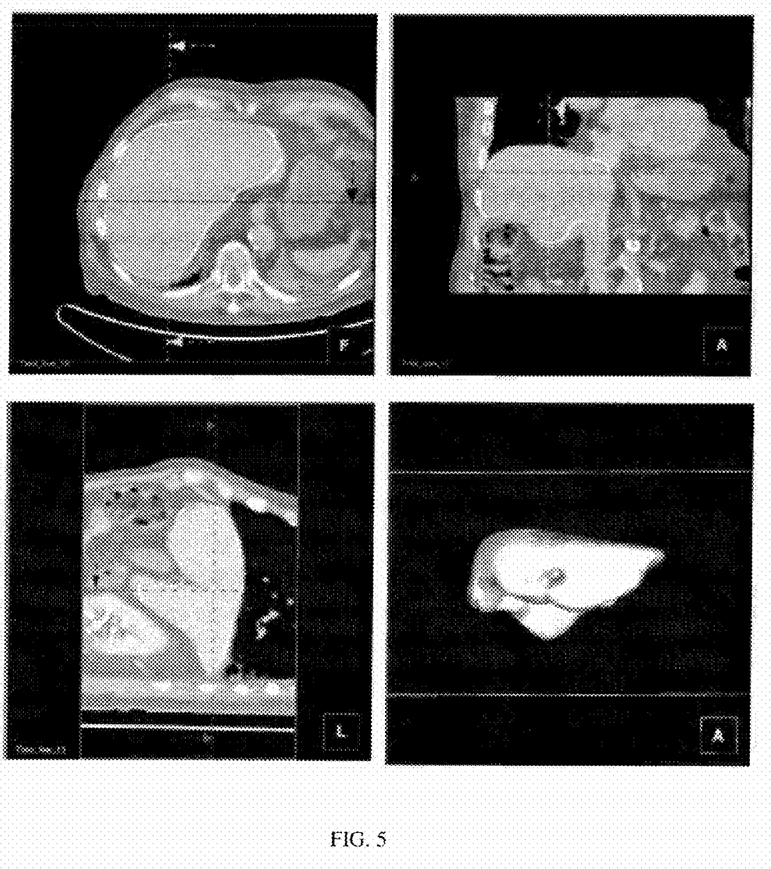
FIGS. 5-8 illustrate segmentations of objects from a background in accordance with one or more aspects of the present invention.
Figure 6:
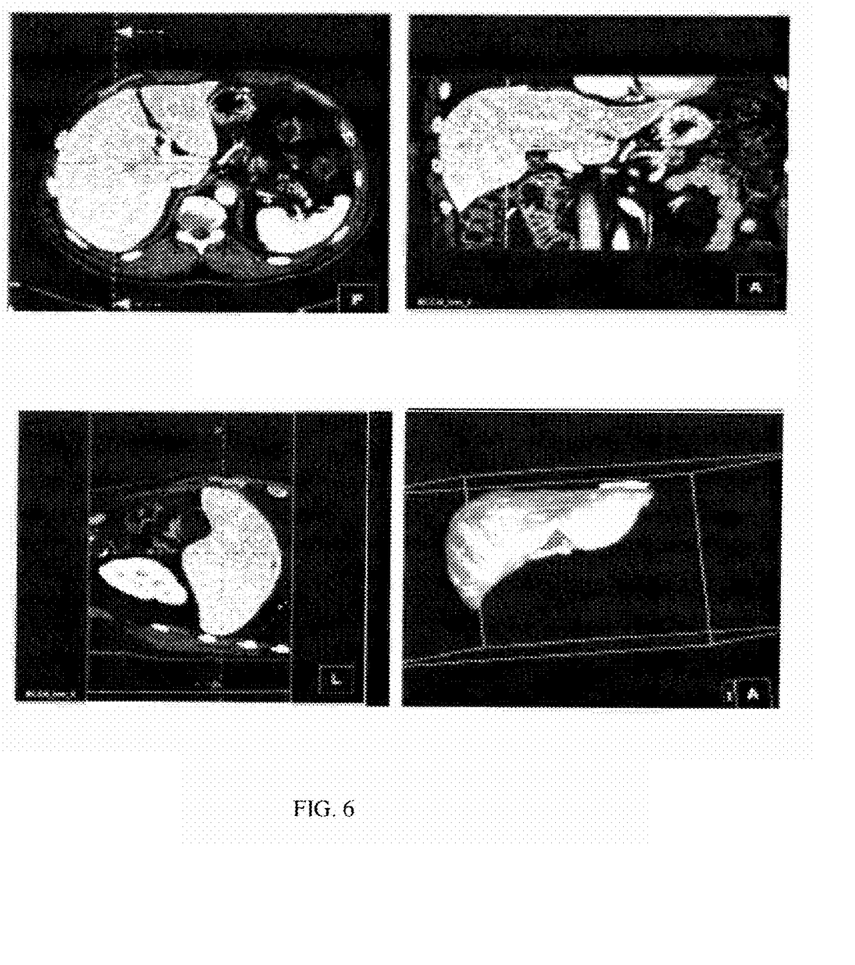
Figure 7:
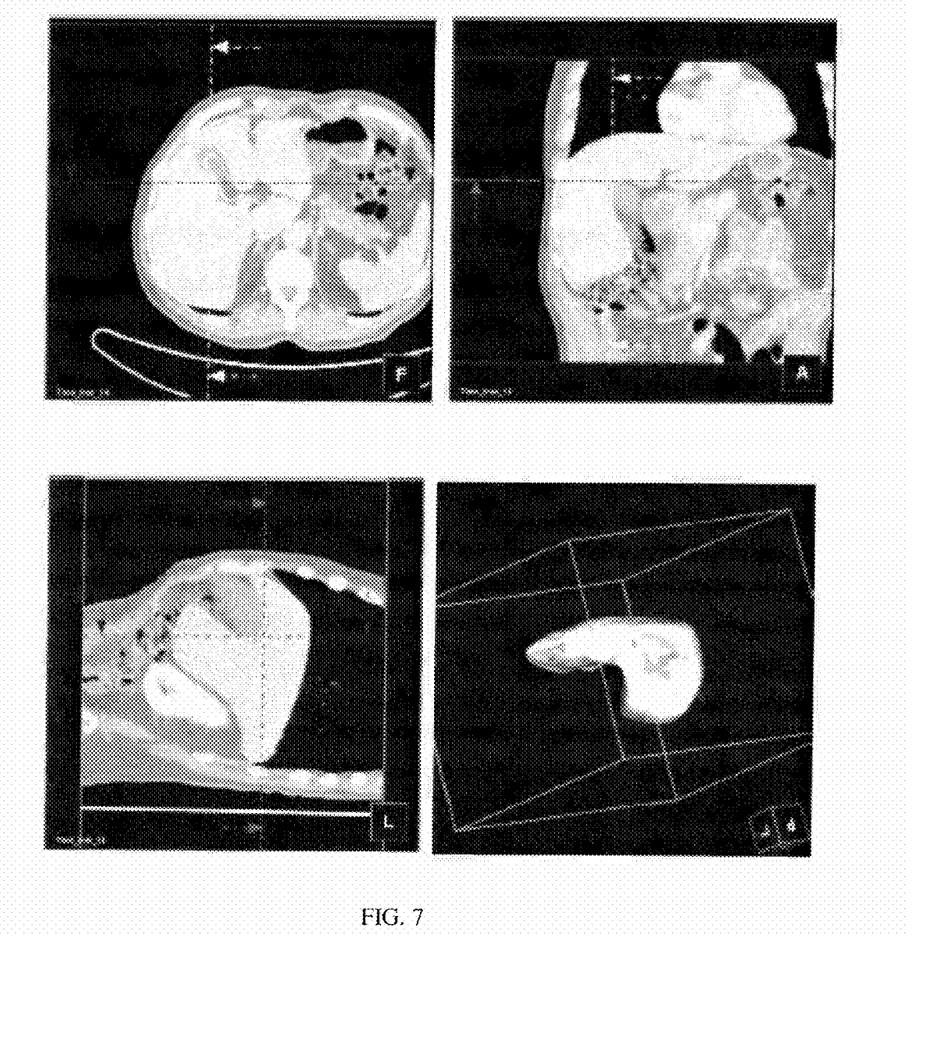
Figure 8:
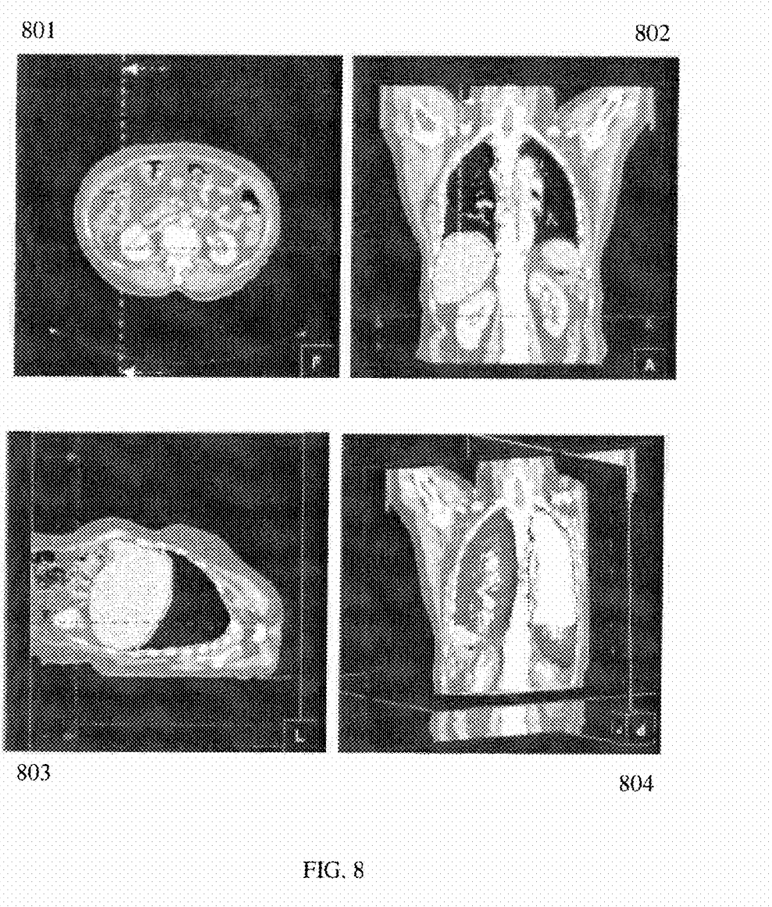

FIGS. 5, 6 and 7 provide each a gallery of liver segmentations with ground truth overlaid. FIG. 8 images 801, 802, 803 and 804 form a gallery of lung, liver, and kidney segmentations in accordance with an aspect of the present invention. FIGS. 5-8 thus demonstrate qualitative segmentation results of a method provided in accordance with an aspect of the present invention as applied to liver, lung and kidney segmentation.

Table 1 shows the numerical validation of our system applied to the MICCAI challenge liver datasets. This table also displays numerical results for other algorithms developed for liver segmentation.

| method | error(mm) | run time | #training | #testing | contrast | spacing | #slices |
|---|---|---|---|---|---|---|---|
| Solder [19] | 2.0 | 900 s | 35 | 35 | yes | 2-3 | n/a |
| Lamecker [20] | 2.3 ± 0.3 | n/q | 43 | 33 | yes | 5 | n/a |
| Heimann [21] | 1.6 ± 0.5 | 600 s | 86 | 54 | yes | 3 | 60-130 |
| Okada [22] | 2.15 | n/a | 28 | 8 | yes | 2.5 | 15 |
| Rusko [18] | 2.01 | 56 s | 40 | 10 | yes | 1-3 | n/a |

| method | error(mm) | run time | #training | #testing | contrast | spacing | #slices |
|---|---|---|---|---|---|---|---|
| Kainmueller [17] | 1.37 | 900 s | 40 | 10 | yes | 1-3 | n/a |
| Ling [12] | 1.59 ± 0.5 1.76 ± .99 | 12 s | 174 | 174 | mixed | 1-5 | 105-524 |
| Inventive Approach | 2.2 ± 1.25 | 135 s | 20 | 35 | mixed | 1-5 | 64-394 |

Despite the fact that these other algorithms were developed specifically for liver segmentation, the universal automatic segmentation approach (Inventive Approach) which is an aspect of the present invention produces segmentations at a competitive quality and computation time to these tailored algorithms. The names and numbers in the "method" column refer to author and reference number of the references provided herein.

In summary, a methodology for generating automatic segmentations is provided that leveraged the universal application of the recent interactive methods by modifying the region term to input a fuzzy notion of object location. The a priori object location and shape information was brought to the datasets. by means of the registration to an atlas generated offline. The proposed fully automatic segmentation engine was validated on datasets with ground truth including the ones from the MICCAI liver segmentation challenge [17, 18]. This validation demonstrated that our system produced competitive error rates and computation times to the gallery of algorithms that were tuned and tailored specifically for the task of liver segmentation. However, without making a single change, one can train the system as provided as an aspect of the present invention with lung and kidney datasets to produce automated lung and kidney segmentation systems. The segmentations generated by these systems are qualitatively promising.

Figure 9:
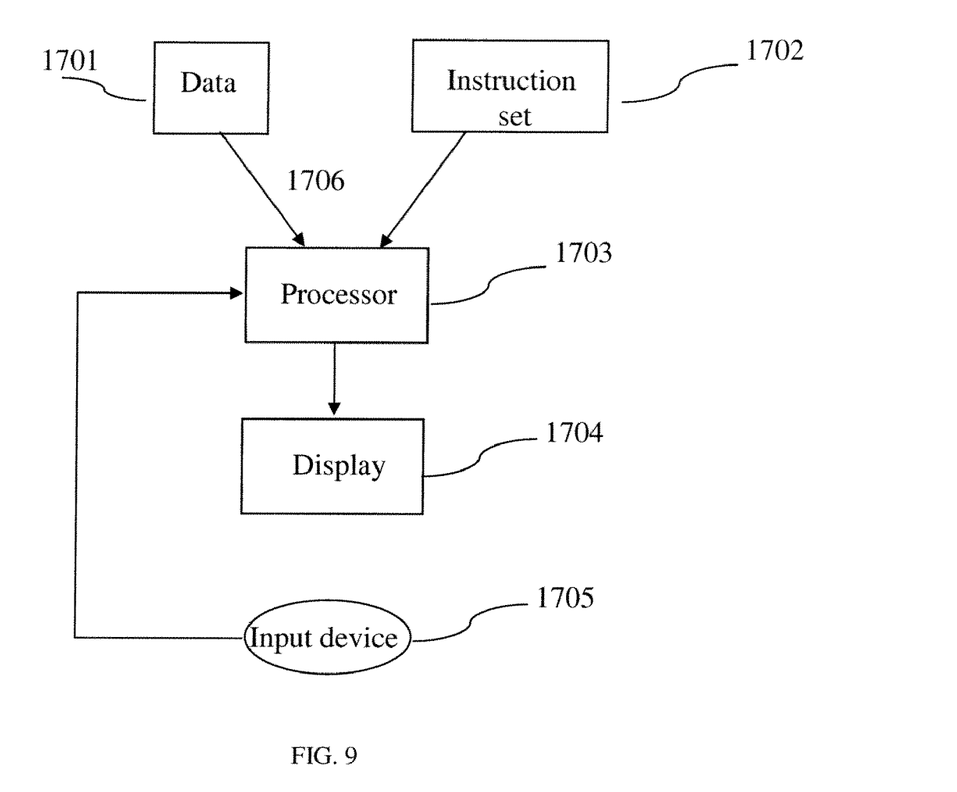
FIG. 9 illustrates a computer system for performing the steps described herein in accordance with another aspect of the present invention.

The image segmentation that is provided as an aspect of the present invention can be executed by a system as shown in FIG. 9. The system is provided with data 1701 representing image data. Such image data may be CT data. It may be stored in a memory so that 1701 is a memory with image data. Image data may be provided on an input 1706 to a processor 1703. An instruction set or program 1702 executing the methods of the present invention is provided. The instruction set may be stored in memory so that 1702 may be a memory with instruction data and made available from memory to processor 1703, which can process the instructions of 1702 and apply it to the data 1701, which may also be stored in a memory. An image, such as a segmented image can be output on a device 1704. Such a device for instance can be a display. The processor can be dedicated hardware. However, the processor can also be a CPU or any other computing device that can execute the instructions of 1702. An input device 1705 like a mouse, or track-ball or other input devices may be present to allow a user to for instance manually segment or manually initiate a segmentation in an image. The input device may also be used to start or stop instructions on the processor. Accordingly, the system as shown in FIG. 9 provides a system for image segmentation using methods disclosed herein.

The term pixel herein also intends to cover the term voxel. Methods and systems provided herein may operate on 3D images, 3D image data or image volumes and on 2D images or 2D image data.

The following references are generally descriptive of the background of the present invention and are hereby incorporated herein by reference: [1]. Boykov, Y., Jolly, M. P.: Interactive organ segmentation using graph cuts. In: Medical Image Computing and Computer-Assisted Intervention, Pittsburgh, Pa. (October 2000) 276-286; [2]. Grady, L.: Random walks for image segmentation. IEEE Trans. on Pattern Analysis and Machine Intelligence 28(11) (November 2006) 1768-1783; [3]. Jolly, M. P., Grady, L.: 3D general segmentation in CT. In: Proc. of ISBI 2008, IEEE (May 2008) 796-799; [4]. Held, K., Kops, E. R., Krause, B. J., Wells III, W. M., Kikinis, R., Muller-Gartner, H. W.: Markov random field segmentation of brain MR images. IEEE T-MI 16(6) (1997) 876-886; [5]. Zhang, Y., Brady, M., Smith, S.: Segmentation of brain MR images through a hidden Markov random field model and the expectation-maximization algorithm. IEEE T-MI 20(1) (2001) 45-57; [6]. Park, H., Bland, P. H., Meyer, C. R.: Construction of an abdominal probabilistic atlas and its application in segmentation. IEEE T-MI 22(4) (2004) 483-492 [7]. Ciofolo, C.: Atlas-based segmentation using level sets and fuzzy labels. In Barillot, C., Haynor, D., Hellier, P., eds.: MICCAI. (2004) 310-317; [8]. Akselrod-Ballin, A., Galun, M., Gomori, M. J., Basri, R., Brandt, A.: Atlas guided identification of brain structures by combining 3D segmentation and SVM classification. In: MICCAI. Volume 2. (2004) 209-217; [9]. van der Lijn, F., den Heijer, T., Breteler, M. M. B., Niessen, W.: Combining graph cuts, atlas registration, and voxel classification for hippocampus segmentation in MR images. In: MMBIA. (2007); [10]. Haas, B., Coradi, T., Scholz, M., Kunz, P., Huber, M., Oppitz, U., Andre, L., Lengkeek, V., Huyskens, D., van Esch, A., Reddick, R.: Automatic segmentation of thoracic and pelvic CT images for radiotherapy planning using implicit anatomic knowledge and organ-specific segmentation strategies. Physics in Medicine and Biology 53 (2008) 1751-1771; [11]. Cuadra, M. B., Pollo, C., Bardera, A., Cuisenaire, O., Villemure, J. G., Thiran, J. P.: Atlas-based segmentation of pathological MR brain images using a model of lesion growth. IEEE T-MI 23(10) (2004) 1301-1314; [12]. Ling, H., Zhou, S. K., Y., Z., Georgescu, B., Suehling, M., Comaniciu, D.: Hierarchical, learning-based automatic liver segmentation. In: CVPR. (2008) 1-8; [13]. Maintz, J. B. A., Viergever, M.: A survey of medical image registration. Medical Image Analysis 2(1) (1998) 1-36; [14]. Grady, L.: Multilabel random walker image segmentation using prior models. In: Proc. of CVPR. (2005) 763-770; [15]. Singaraju, D., Grady, L., Vidal, R.: Interactive image segmentation of quadratic energies on directed graphs. In: Proc. of CVPR 2008, IEEE Computer Society, IEEE (June 2008); [16]. Grady, L., Schwartz, E. L.: Isoperimetric graph partitioning for image segmentation. IEEE Trans. on Pat. Anal. and Mach. Int. 28(3) (March 2006) 469-475; [17]. Kainmueller, D., Lange, T., Lamecker., H.: Shape constrained automatic segmentation of the liver based on a heuristic intensity model. In: MICCAI Wshp. 3D Segmentation in the Clinic: A Grand Challenge. (2007); [18]. Rusko, L., Bekes, G., Nemeth, G., Fidrich, M.: Fully automatic liver segmentation for contrast-enhanced CT images. In: MICCAI Wshp. 3D Segmentation in the Clinic: A Grand Challenge. (2007) [19]. Soler, L., Delingette, H., Malandain, G., Montagnat, J., Ayache, N., Koehl, C., Dourthe, O., Malassagne, B., Smith, M., Mutter, D., Marescaux, J.: Fully automatic anatomical, pathological, and functional segmentation from ct scans for hepatic surgery. Computer Aided Surgery 6(3) (2001) 131-142 [20]. Lamecker, H., Lange, T., Seebaee, M.: Segmentation of the liver using a 3D statistical shape model. In: ZIB Tech Report. (2004); [21]. Heimann, T., Munzing, S., Meinzer, H. P., Wolf, I.: A shape-guided deformable model with evolutionary algorithm initialization for 3D soft tissue segmentation. In: IPMI. (2007); and [22]. Okada, T., Shimada, R., Sato, Y., Hori, M., K. Yokota, M. N., Chen, Y., Nakamura, H., Tamura, S.: Automated segmentation of the liver from 3D CT images using probabilistic atlas and multi-level statistical shape model. In: MICCAI. (2007) 1-8; [23] Timothy F. Cootes, Christopher J. Taylor, David H. Cooper, Jim Graham: Active Shape Models-Their Training and Application. Computer Vision and Image Understanding 61(1): 38-59 (1995); [24] Andrew Hill, Timothy F. Cootes, Christopher J. Taylor: Active Shape Models and the shape approximation problem. Image Vision Comput. 14(8): 601-607 (1996); [25] Timothy F. Cootes, Gareth J. Edwards, Christopher J. Taylor: Active Appearance Models. ECCV (2) 1998: 484-498; [26] S. Warfield and A. Robatino and J. Dengler and F. Jolesz and R. Kikinis, Nonlinear Registration and Template Driven Segmentation. chapter 4, pp. 67-84, Progressive Publishing Alternatives, 1998; and [27] U. Grenander, General Pattern Theory. Oxford, U.K.: Oxford Univ. Press, 1994.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims appended hereto.

The invention claimed is:

1. A method for universal segmentation of an object from an image data set by a processor, comprising:
   applying an atlas data set corresponding to the image data set;
   creating a plurality of segmented objects from a plurality of training data sets;
   registering the plurality of segmented objects to the atlas data set;
   applying the registered plurality of segmented object as fuzzy seeds; and
   segmenting the object from the image data set by a random walker segmentation using the fuzzy seeds.

2. The method as claimed in claim 1, wherein the atlas data set contains a segmentation of an object which may be represented by an initial mask $M_a$.

3. The method as claimed in claim 2, wherein a segmented object i in one of a plurality of n segmented objects may be represented as a binary mask $M_i$ and a fuzzy seed volume $M_a^f$ of fuzzy seeds may be represented by $$M_a^f = \frac{1}{n+1}\left(M_a + \sum_i M_i\right)$$

with n an integer greater than 1.

4. The method as claimed in claim 3, further comprising: transforming $M_a^f$ into a coordinate system of the image data set.

5. The method as claimed in claim 4, further comprising: removing fuzzy seeds from mask $M_a^f$ that are registered to pixels in the image data set having outlier intensities described by a probability density function of pixel intensities contained in mask $M_a^f$.

6. The method as claimed in claim 5, wherein the random walker segmentation is performed as a directed random walker with unary terms provided by the fuzzy seeds.

7. The method as claimed in claim 6, wherein the registration of the image data set to the atlas data set is a process containing a plurality of steps, wherein a step can be expressed as:

$$\hat{T}_k = \operatorname*{argmax}_T S_{M_k}(I_a(x), I(T(x))) \text{ subject to } C_k(T) = 0,$$

with k being a step number, $S_{M_k}$ is a similarity measure, $M_k$ is a specific mask used to compute the similarity measure, I is the image to be registered to the atlas data, x represent the pixels in I, and $C_k$ is a transformation constraint enforced on T, which is a transformation map.

8. The method as claimed in claim 7, wherein the registration comprises at least:
   applying mutual information as a metric and global affine with a reduced set of parameters;
   applying mutual information and local affine with a reduced set of parameters;
   applying cross-correlation and local affine with all 12 parameters.

9. The method as claimed in claim 7, wherein the registration is repeated in a hierarchical fashion.

10. The method as claimed in claim 1, wherein the object is one of a group consisting of liver, lung and kidney.

11. A system for universal segmentation of an object from an image data set, comprising:
    a processor;
    a memory readable by the processor, the memory comprising program instructions executable by the processor, the program instructions adapted to perform the following steps:
       applying an atlas data set corresponding to the image data set;
       creating a plurality of segmented objects from a plurality of training data sets;
       registering the plurality of segmented objects to the atlas data set;
       applying the registered plurality of segmented object as fuzzy seeds; and
       segmenting the object from the image data set by a random walker segmentation using the fuzzy seeds.

12. The system as claimed in claim 11, wherein the atlas data set contains a segmentation of an object which may be represented by an initial mask $M_a$.

13. The system as claimed in claim 12, wherein a segmented object i in one of a plurality of n segmented objects may be represented as a binary mask $M_i$ and a fuzzy seed volume $M_a^f$ of fuzzy seeds may be represented by $$M_a^f = \frac{1}{n+1}\left(M_a + \sum_i M_i\right)$$

with n an integer greater than 1.

14. The system as claimed in claim 13, further comprising: transforming $M_a^f$ into a coordinate system of the image data set.

15. The system as claimed in claim 14, further comprising: removing fuzzy seeds from mask $M_a^f$ that are registered to pixels in the image data set having outlier intensities described by a probability density function of pixel intensities contained in mask $M_a^f$.

16. The system as claimed in claim 15, wherein the random walker segmentation is performed as a directed random walker with unary terms provided by the fuzzy seeds.

17. The system as claimed in claim 16, wherein the registration of the image data set to the atlas data set is a process containing a plurality of steps, wherein a step can be expressed as:

$$\hat{T}_k = \underset{T}{\operatorname{argmax}} S_{M_k}(I_a(x), I(T(x))) \text{ subject to } C_k(T) = 0,$$

with k being a step number, $S_{M_k}$ is a similarity measure, $M_k$ is a specific mask used to compute the similarity measure, I is the image to be registered to the atlas data, x represent the pixels in I, and $C_k$ is a transformation constraint enforced on T, which is a transformation map.

18. The system as claimed in claim 17, wherein the registration comprises at least instructions for:
  applying mutual information as a metric and global affine with a reduced set of parameters;
  applying mutual information and local affine with a reduced set of parameters;
  applying cross-correlation and local affine with all 12 parameters.

19. The system as claimed in claim 17, wherein the registration is repeated in a hierarchical fashion.

20. The system as claimed in claim 11, wherein the object is one of a group consisting of liver, lung and kidney.

* * * * *